United States Patent Office 3,437,718
Patented Apr. 8, 1969

3,437,718
POLYMER BLENDS
Richard Watkin Rees, Orange, Tex., assignor to E. I. du Pont de Nemours and Company, Wilmington, Del., a corporation of Delaware
No Drawing. Continuation-in-part of abandoned application Ser. No. 239,821, Nov. 23, 1962, which is a continuation-in-part of application Ser. No. 209,789, July 13, 1962. This application Jan. 23, 1967, Ser. No. 610,818
Int. Cl. C08f 29/36, 29/56
U.S. Cl. 260—889                5 Claims

ABSTRACT OF THE DISCLOSURE

The present invention relates to compatible polymer blends formed from incompatible polymers which are made compatible by ionic linking with metal ions acid groups which are attached to each of said polymers.

CROSS-REFERENCE TO RELATED APPLICATIONS

This application is a continuation-in-part of copending application Ser. No. 239,821 filed Nov. 23, 1962, now abandoned which, in turn, is a continuation-in-part of application Ser. No. 209,789 filed July 13, 1962, now abandoned.

BACKGROUND OF THE INVENTION

The blending of polymers is well known in the art. The usual purpose in blending polymers is to obtain a blend which combines the desired properties of the polymers being blended, and to thereby overcome some weakness in one of the constituents in the blend. In the past, the number of polymers which could be blended to yield a polymer blend of improved properties has been severely limited by compatibility problems.

It is an object of this invention to provide a means by which normally incompatible polymers can be made compatible and be blended to yield a blend with superior properties.

SUMMARY OF THE INVENTION

These and other objects are accomplished by modifying incompatible addition polymers by copolymerization with alpha,beta-ethylenically unsaturated carboxylic acid monomer, ionically cross-linking the copolymer components of the blend and simultaneously or subsequently blending the polymer components until a homogeneous compatible blend is obtained. The incompatible copolymeric material employed in the formation of blends in accordance with the present invention fall, in general, in two classes of materials and are described hereinafter in greater detail as the first and the second copolymer constituent of the blend. The copolymers prior to their ionic cross-linking are considered the base materials from which the blends of the present invention are formed. The cross-linking agent is present in an amount of from 0.2 mole percent based on the total polymer blend up to a stoichiometric equivalent of the carboxylic acid groups present in the polymer and wherein at least 10 percent of the carboxylic acid groups present in the polymer are reacted with the cross-linking agent.

The polymers used as blend components in this invention are addition copolymers of monomers containing carboxylic acid groups. Any two addition polymers, normally solid and of high molecular weight, which have the necessary carboxylic acid group content and which, when blended with each other, give rise to inhomogeneous, non-uniform, incompatible blends, may be changed into compatible, uniform and homogeneous blends by the process of the invention described hereinafter in greater detail. However, the first polymer, which forms from 5 to 95 percent of the blend, is preferably a copolymer of an alpha-olefin having the general formula $RCH=CH_2$, where R is a radical selected from the class consisting of hydrogen and alkyl radicals having from 1 to 8 carbon atoms, the olefin content of said polymer being at least 50 mole percent based on the polymer, and an alpha, beta-ethylenically unsaturated carboxylic acid having one or two carboxylic acid groups, the acid monomer content of said polymer being from 0.2 to 25 mole percent based on the polymer. The alpha-olefin polymers employed in the formation of the ionic copolymers are copolymers of alpha-olefins with ethylenically unsaturated carboxylic acids. As indicated, the alpha-olefins employed in the copolymer are alpha-olefins which have the general formula $RCH=CH_2$, where R is either hydrogen or an alkyl group having preferably from 1 to 8 carbon atoms. Thus, suitable olefins include, ethylene, propylene, butene-1, pentene - 1, hexene - 1, heptene - 1, 3 - methyl - butene - 1, 4-methylpentene - 1, etc. Although polymers of olefins having higher carbon numbers can be employed in the present invention, they are not materials which are readily obtained or available. The concentration of the alpha-olefin is at least 50 mole percent in the copolymer, and is preferably greater than 75 mole percent.

The second essential component of the first copolymer preferably comprises an alpha,beta-ethylenically unsaturated carboxylic acid group containing monomer having preferably from 3 to 10 carbon atoms. Examples of such monomers are acrylic acid, methacrylic acid, ethacrylic acid, itaconic acid, maleic acid, fumarci acid, monoesters of said dicarboxylic acids, such as methyl hydrogen maleate, methyl hydrogen fumarate, and ethyl hydrogen fumarate, mononitriles of said dicarboxylic acids such as beta-cyano acrylic acid, and monoamides of said dicarboxylic acids such as fumaric monoamide. In general, it is preferred that the alcohol or amine forming the respective ester or amide, with one of the carboxylic acid groups of said dicarboxylic acids, be an alkyl alcohol or amine which alkyl group contains up to 10 carbon atoms. As indicated, the concentration of acidic monomer in the first copolymer is from 0.2 to 25 mole percent and, preferably, from 1 to 10 mole percent.

The second copolymer constituent of the blend generally contains from 0.2 to 50 mole percent, based on the copolymer, of an alpha,beta-unsaturated carboxylic acid of the identical class hereinabove-described for forming the alpha-beta-ethylenically unsaturated carboxylic acid constituent in the first copolymer constituent of the blend. The second copolymer preferably contains from 1 to 50 mole percent of such alpha,beta-ethylenically unsaturated carboxylic acid. The second copolymer preferably contains at least 50 mole percent of a monomer selected from the group of monomer units having the structure $$CH_2=CH-R_1$$

wherein —$R_1$ is selected from the group consisting of aromatic radicals, ester radicals, amide radicals, acyloxy radicals, alkoxy radicals, halogens, acyl radicals, alkenyl radicals and nitriles, and monomer units having the structure

wherein —$R_2$ is selected from the group consisting of halogens, and methyl, and —$R_3$ is selected from the group consisting of halogens, the phenyl radical, ester radicals, amide radicals, alkenyl and nitriles.

The remaining constituent, if any, in the first copolymer is generally selected from the comonomers above defined for use as the major constituent in the second copolymer. The remaining constituent in the second copolymer is generally an alpha-olefin as described for use as the major comonomer constituent in the first copolymer and preferably does not comprise over 25 mole percent of the copolymer.

The base copolymers employed in forming the ionic copolymers of the present invention may be prepared in several ways. Thus, the copolymers may be obtained by the copolymerization of the alpha-olefin or second copolymer major comonomer and the carboxylic acid monomer. This method is preferred for the copolymers of ethylene employed in the present invention. Methods employed for the preparation of ethylene/carboxylic acid copolymers have been described in the literature. In a preferred process, a mixture of the two monomers is introduced into a polymerization environment maintained at high pressures, 50 to 3,000 atmospheres, and elevated temperatures, 150 to 300° C., together with a free radical polymerization initiator such as a peroxide. An inert solvent for the system, such as benzene, may be employed, or the polymerization may be substantially a bulk polymerization.

The present invention, however, is not limited to copolymers obtained by direct copolymerization of the major ethylenically unsaturated monomeric constituent with an alpha, beta-ethylenically unsaturated carboxylic acid comonomer. The base resins employed in the ionic copolymer blends of this invention may also be obtained by the grafting of the acid comonomer to a polymer base of the major comonomer. Such graft copolymers are generally obtained by exposing a solution or finely divided powder of a polymer of the major comonomer to ionizing radiation in the presence of the carboxylic acid comonomer. In another method, the polymer of the major comonomer in solution or in a finely divided form is contacted with a solution of the acid and a peroxide. Graft polymerization has been described in great detail in the literature and is for that reason not further detailed. These techniques are preferably employed with the hereinabove-described major constituent polymers obtained from alpha-olefins of higher molecular weight than ethylene, such as propylene, butene-1, etc., since these latter monomers do not readily lend themselves to the direct copolymerization with the acid comonomers, although polymers of ethylene can, of course, also be prepared in this manner. Copolymers of the major constituent monomer with carboxylic acids may also be prepared by copolymerization of the major constituent monomer with an alpha-beta-ethylenically unsaturated carboxylic acid derivative which subsequently or during copolymerization is reacted either completely or in part to form the free acid. Thus, hydrolysis, saponification or pyrolysis may be employed to form an acid copolymer from an ester copolymer.

The copolymers employed to form ionic copolymers which are useful as plastics are preferably of high molecular weight in order to achieve the outstanding combination of solid state properties which can be obtained through the use of this invention. Although the mechanical properties of low molecular weight copolymer blends are improved by the process of the present invention, the resulting product does not exhibit such mechanical properties as are obtained when blending high molecular weight copolymers. The molecular weight of the copolymers useful as base resins is most suitably defined by melt indices, a measure of melt viscosity, described in detail in ASTM-D-1238-57T which test was used to determine all melt indices herein reported. The melt indices of copolymers employed in the formation of ionic copolymers which are useful as plastics is preferably in the range of 0.1 to 100 g./10 minutes and, more particularly, in the range of 1.0 to 20 g./minutes. However, it should be pointed out that low molecular weight copolymers result in ionic copolymers which, although not suitable as plastics, are outstanding adhesives and laminating resins.

The copolymer base resins used need not necessarily comprise a two component copolymer. Thus, although the major monomer constituent of the copolymer should be at least 50 mole percent, more than one of the major constituent comonomers above-described for use in the first copolymer constituent of the blend may be used to form the 50 mole percent required and more than one of the above-described comonomers for use in the second copolymer constituent of the blend may be used to form the 50 mole percent required. Additionally, any third polymerizable monomer can be employed in combination with the major constituent comonomer and alpha,beta-ethylenically unsaturated carboxylic acid comonomer.

The scope of the base copolymers suitable for use as the first copolymer constituent of the blend of this invention is illustrated by the following examples: ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene acrylic acid copolymers, ethylene/styrene/acrylic acid copolymers, ethylene/methacrylic acid/acrylonitrile copolymers, ethylene/fumaric acid/vinyl methyl ether copolymers, ethylene/vinylidene chloride/acrylic acid copolymers, ethylene/vinyl fluoride/methacrylic acid copolymers, ethylene/chlorotrifluoroethylene/methacrylic acid copolymers, polyethylene/acrylic acid graft copolymers, polyethylene/methacrylic acid graft copolymers, polymerized ethylene/propylene acrylic acid graft copolymers, polymerized ethylene/butene-1 methacrylic acid graft copolymers, polymerized ethylene/vinyl acetate methacrylic acid graft copolymers, polypropylene/acrylic acid graft copolymers, polypropylene/methacrylic acid graft copolymers, polybutene/acrylic acid graft copolymers, polybutene/acrylic acid graft copolymers poly-3-methylbutene-1/acrylic acid graft copolymers and polyethyelne/acrylic acid/ethyl acrylate graft copolymers.

The scope of the base copolymers suitable for use as the second copolymer constituent of the blend of this invention is illustrated by the following examples: methyl methacrylate/methacrylic acid copolymers, styrene/acrylic acid/copolymers, vinylidene chloride/acrylic acid copolymers, vinyl acetate/itaconic acid copolymers, N-butyl acrylamide/acrylic acid copolymers, polyethylene terephthalate/itaconic acid graft copolymers, methyl vinyl ether/fumaric acid copolymers, butadiene/styrene/methacrylic acid copolymers, acrylonitrile/acrylic acid copolymers, vinyl chloride/methyl hydrogen itaconate copolymers, 1-methyl styrene/methacrylic acid graft copolymers, 2-methyl allyl ether/maleic acid copolymers, 2-methyl butadiene/ethyl acrylate/itaconic acid graft copolymers, ethyl methacrylate/methacrylic acid copolymers, methacrylamide/methacrylic acid copolymers, and methacrylonitrile/methacrylic acid copolymers.

The ionic copolymer blends of the present invention are made compatible by the reaction of the described copolymer constituents with certain hereinafter defined ionizable metal compounds.

The ionizable metal compound reaction is herein referred to as "neutralization." The reaction mechanism involved in the formation of the ionic copolymers and the exact structure of the copolymer blends are at the present time not completely understood. However, a comparison of the infrared spectrum of the copolymer blend starting material with that of the ionic copolymer blend shows the appearance of an absorption band at about 6.4 microns which is characteristic of the ionized carboxyl group, COO—, a decrease in the crystallinity band at 13.7 microns and a substantial decrease, depending on the degree of neutralization, of a band at 10.6 microns, characteristic of the unionized carboxyl group, COOH. It is consequently deduced that the surprising properties of ionic copolymer blends are the result of an ionic attraction between the metal ion and one or more carboxylic acid groups.

This ionic attraction results in a form of cross-linking which occurs in the solid state. However, when molten and subjected to the shear stresses which occur during melt fabrication, the ionic cross-links of these polymer blends are ruptured and the polymer blends exhibit melt flow essentially the same as the average of the two base linear copolymers. On cooling of the melt and the absence of shear stress occurring during fabrication, the cross-links, because of their ionic nature, are reformed and the solidified copolymer blend again exhibits the properties of a cross-linked polymer.

The change in properties resulting from neutralization or cross-linking of the base copolymer blend to the ionic copolymer blend is greatly influenced by the degree of cross-linking and, therefore, the number of cross-links and the nature of the cross-link involved. Although an improvement in solid state compatibility properties is obtained with even a small percentage of the acid groups neutralized, in general, a noticeable improvement is observed only after the cross-linking agent equals 0.2 mole percent of the total polymer blend and at least 10 percent of the carboxylic acid groups are neutralized. However, to obtain the optimum solid state blend compatibility, properties which are derivable from ionic copolymer blends, the number of cross-links should be sufficient to form an infinite network of cross-linked polymer chains. This, of course, not only depends on the degree of neutralization, but also on the number of cross-linking sites, and the molecular weight of the base copolymers in the blend. In general, it was found that base copolymers having molecular weights as measured by melt index of 10 to 100 and preferably 25 to 50 g./10 minutes and an average alpha,beta-ethylenically unsaturated carboxylic acid concentration of 1 to 10 mole percent show optimum solid state compatibility properties upon 50 to 80 percent neutralization. The degree of neutralization can be decreased as the molecular weight of the copolymer constituents is increased or as the acid content of the copolymer constituents is increased without significantly changing the solid state compatibility properties of the blend. In general, no substantial further improvement in solid state compatibility properties is observed if the cross-linking is continued beyond the point at which infinite network is formed. However, the shear stress necessary to break the metal ion cross-link and thus, make the copolymer melt fabricable is steadily increased with an increasing number of cross-links beyond that necessary to achieve an infinite network.

Metal ions which are suitable for use in the present invention can be divided into two categories, uncomplexed or free metal ions and complexed metal ions. In the uncomplexed metal ions, the valence of the ion corresponds to the valence of the metal. These metal ions are obtained from the commonly known and used metal salts. Although suitable metal ions may be selected from any group of the Periodic Table, those having a valence of greater than 1 must be complexed so that the effective valence does not exceed 1.75. The use of metal ions having an effective valence of greater than 1.75 yields intractable products. The complexed metal ions generally are those in which the metal is bonded to more than one type of salt group, at least one of which is ionized and at least one of which is not. The effective valence of the metal ions is determined by the proportion of the original anion remaining in the blend. Since formation of the ionic copolymers preferably requires only one ionized valence state, it will be apparent that such complexed metal ions are equally well suited for use in the present invention. The term "metal ion having an ionized valence state of from 1 to 1.75" means a metal ion having the general formula $Me^{+n}X_m$, where $n$ is the average ionic charge or effective valence of the metal ions present and varies from 1 to 1.75, $x$ is a nonionized group and $n+m$ is the valence of the metal. The utility of a complexed metal ion employed in the formation of ionic copolymers corresponds to an uncomplexed metal ion having the same effective ionized valence. For example, a trivalent metal with two groups attached behaves as a monovalent ion in these ionic copolymer blends. Thus, higher valent metals may be included depending on how many metal valences are complexed and how many can be ionized. The preferred complexed metal ions are the mixed salts of very weak acids, such as fatty acids, with ionizable acids such as formic acid or acetic acid. The suitable uncomplexed metal ions for use in this invention have a valence of one and include $Na^+$, $K^+$, $Li^+$, $Cs^+$, $Ag^+$, $Hg^+$, and $Cu^+$. The alkali metals are preferred, because they result in ionic copolymers having the best combination of improvement in solid state compatibility properties along with retention of metal fabricability. It is not essential that only one metal ion be employed in cross-linking the copolymer constituents of the blend, and more than one metal ion may be preferred in some instances.

The quantity of cross-linking agent employed or the degree of neturalization of the acid groups in the blend will differ with the degree of solid property change, degree of melt property change, and degree of compatibility of the blend constituents desired for a particular application. In general, it was found that the concentration of the crosslinking agent should be sufficient to react with or neutralize at least 10 percent of the carboxylic acid groups in order to obtain a significant improvement in the degree of compatibility of the blend. As explained above, the degree of neutralization for optimum properties will vary with the acid concentration and the molecular weight of the copolymer. However, it is generally desirable to neutralize at least 50 percent of the acid groups. The degree of neutralization may be measured by several techniques. Thus, infrared analysis may be employed and the degree of neutralization calculated from the changes resulting in the absorption bands. Another method for use with metal ion cross-linked blends comprises the titration of a solution of the cross-linked blend with a strong base. In general, it was found that the added metal ion reacts stoichiometrically with the carboxylic acid in the blend up to 90 percent neutralization. Small excess quantities of the cross-linking agent are necessary to carry the neutralization to completion. Large excess quaitities of cross-linking agent are to be avoided since they do not improve the properties of the blend and, on the contrary, may have a detrimental effect on said blend.

The cross-linking of the blend is carried out by the addition of the metal compound to the blend. The metal compound which is employed must contain the metal in the ionic state rather than covalently bonded. It is, furthermore, essential in order to achieve the ionic cross-link that the cross-linking compound be water-soluble. A compound is considered water-soluble for the purposes of the present invention if it is soluble in water at room temperature to the extent of two weight percent. This requirement is explained as separating those ionic compounds which are capable of exchanging a metal ion for the hydrogen ion of the carboxylic acid group in the copolymer blend from those which do not interact with the acid. The third requirement for the metal compound employed to give rise to the ionic cross-link is that the salt radical reacting with the hydrogen of the carboxylic acid group must form a compound which is removable from the copolymer at the reaction conditions, such as by volatilization, preferential solubility, etc. This requirement is essentially to obtain the carboxylic acid groups in the blend in ionic form and, furthermore, to remove the salt radical from the copolymer so that the attraction between the ionized carboxylic acid groups of the blend and the metal ion is not overshadowed by the attraction of the metal ion and its original salt radical. Although the foregoing limits delineate metal compounds suitable in forming metal ions in the acid copolymers which result in ionic cross-links, certain types of compounds are preferred because of their ready availability and ease of reaction. Preferred metal salts include formates, acetates, hydroxides of sufficient solubility, methoxides, ethoxides, nitrates, carbonates, and bicarbonates. Metal compounds which are generally not suitable in resulting in ionic cross-links include in particular, metal oxides because of their lack of solubility metal salts of fatty acids which form non-volatile residues remaining in the polymer and metal coordination compounds which lack the necessary ionic character.

The cross-linking reaction is carried out under conditions which allow for a homogeneous distribution of the cross-linking agent in the copolymer base. No particular reaction conditions are essential except that the conditions should permit the removal of the hydrogen-salt radical reaction product, when cross-linking with metal ions. Since the homogeneous distribution of the cross-linking agent and the necessary removal of the hydrogen-salt radical reaction product is difficult at room temperature, elevated temperatures are generally employed. More specifically, the cross-linking reaction is carried out either by melt blending the polymer blend with the cross-linking metal compound, which preferably is employed in solution, or by adding the cross-linking agent, directly or in solution, to a solution of the copolymer blend and then, on reaction, precipitating and separating the resulting cross-linked blend. Of these techniques, the first is greatly preferred because of its relatively simplicity. It is to be understood, however, that the specific technique employed is not critical as long as it meets the specific requirements set forth above.

DESCRIPTION OF THE PREFERRED EMBODIMENTS

Example I

A 25 gram quantity of an ethylene/methacrylic acid copolymer containing 18 percent methacrylic acid is milled for 15 minutes at 175 to 180° C. with an equal weight of methyl methacrylate-methacrylic acid copolymer containing 10 percent methacrylic acid. The product of this experiment is inhomogeneous in appearance, with discrete masses of the methyl methacrylate resin imbedded in a matrix of the ethylene copolymer. Stiffness of the material is low and sheets could be torn very readily.

The above experiment is repeated, with the difference that zinc acetate (7 grams) is added to the material during milling. The product is then found to be clear and homogeneous in appearance, with high stiffness and excellent toughness.

The above experiment is repeated with 7 grams of sodium methylate replacing the zinc acetate. The product is homogeneous in appearance, stiff and tough. Tensile and stiffness data on these samples are summarized below.

| Sample | Cross-linking agent | Stiffness (p.s.i.) | Yield point (p.s.i.) |
| --- | --- | --- | --- |
| Ethylene/methacrylic acid | | 16,400 | 1,440 |
| MMA/methacrylic acid | | 420,000 | 4,350 |
| E/MMA+MMA/MAA | | 28,300 | 1,100 |
| E/MAA+MMA/MAA | Zinc acetate | 122,300 | 3,550 |
| E/MAA+MMA/MAA | Sodium methylate | 148,760 | 3,720 |

In the above table and the following tables, E stands for ethylene, MMA stands for methyl methacrylate, MAA stands for methacrylic acid, S stands for styrene, MA stands for methyl acrylate, and VA stands for vinyl acetate.

Example I is repeated substituting for the methyl methacrylate-methacrylic acid copolymer, an equal weight of copolymer of 10 weight percent methacrylic acid and 90 weight percent of each of acrylamide, methyl vinyl ether, vinylidene chloride, methyl styrene, methacrylamine, 2-methyl butadiene and methacrylonitrile with satisfactory results.

Example II

A 25 gram quantity of ethylene-10 percent methacrylic acid copolymer is milled for 15 minutes at 140° C. with an equal weight of styrene-10 percent methacrylic acid copolymer. The product is visually inhomogeneous. Molded sheets had poor tear strength and tensile strength.

The above experiment is repeated with the addition of 6.4 grams zinc acetate during the milling. The product is homogeneous and much improved in tensile properties, as shown by the data below.

| Sample | Cross-linking agent | Yield point (p.s.i.) | Ultimate tensile strength (p.s.i.) |
| --- | --- | --- | --- |
| E/MAA | | 890 | 3,400 |
| S/MAA | | 4,960 | 4,960 |
| E/MAA+S/MAA | | 1,000 | 1,744 |
| E/MAA+S/MAA | Zinc acetate | 2,100 | 3,020 |

Example III

A 25 gram sample of ethylene-10 percent methacrylic acid copolymer is milled for 15 minutes to 140° C. with 25 grams of methyl acrylate-10 percent methacrylic acid copolymer. The product is quite homogeneous in appearance but showed evidence of serious incompatability in mechanical behavior. Molded bars crazed severely on bending and actually crack on repeated flexing. Tensile strength is very low.

The above experiment is repeated with the addition of 6.4 grams zinc acetate during milling. Molded bars of this product can be creased repeatedly without crazing or weakening. The improved tensile properties are illustrated by the data below.

| Sample | Cross-linking agent | Yield point (p.s.i.) | Ultimate tensile strength (p.s.i.) | Ultimate elongation (percent) |
| --- | --- | --- | --- | --- |
| E/MAA | | 890 | 3,400 | 550 |
| MA/MAA | | 1,430 | 3,700 | 230 |
| E/MAA+MA/MAA | | 290 | 965 | 60 |
| E/MAA+MA/MAA | Zinc acetate | 1,510 | 3,400 | 230 |

Example IV

A 25 gram sample of ethylene-10 percent methacrylic acid copolymer is blended with 25 grams vinyl acetate-10 percent methacrylic acid by milling for 15 minutes at 150° C. The product is low in stiffness and tensile strength due to poor compatibility.

The above experiment is repeated with the addition of 6.4 grams zinc acetate during milling. The product was greatly improved in stiffness and tensile properties, as shown by the data below.

| Sample | Cross-linking agent | Stiffness (p.s.i.) | Yield point (p.s.i.) |
| --- | --- | --- | --- |
| E/MAA | | 10,000 | 890 |
| VA/MAA | | 410,000 | 3,800 |
| E/MAA-VA/MAA | | 54,800 | 930 |
| E/MAA-VA/MAA | Zinc acetate | 100,000 | 1,480 |

Examples V–VIII

These experiments are performed using the same general procedures outlined in the foregoing examples. Property data are summarized in the table. These illustrate the improved tensile properties achieved by ionic cross-linking of the polymer blends.

In each of Examples V to VIII, the cross-linking agent was added in an amount stoichiometrically equivalent to the acid groups in the blend.

TABLE

| Example No. | Component I | Stiffness (p.s.i.) | Yield (p.s.i.) | Elongation percent | Component II | Stiffness (p.s.i.) | Yield (p.s.i.) |
|---|---|---|---|---|---|---|---|
| 5 | E/VA/MAA, 70/20/10 | 2,000 | 290 | 530 | Styrene/maleic acid, 90/10 | 280,000 | 4,900 |
| 6 | E/MMA/Acrylic acid, 65/25/10 | 1,200 | 210 | 600 | Vinyl chloride/acrylic acid, 92/8 | 405,000 | 3,300 |
| 7 | E/Itaconic acid, 94/6 | 15,800 | 1,320 | 430 | Acrylonitrile/acrylic acid, 90/10 | 436,000 | 5,100 |
| 8 | Butadiene/acrylonitrile/acrylic acid, 50/40/10 | 820 | [1] 720 | 450 | Vinyl chloride/methacrylic acid, 90/10 | 428,000 | 3,700 |

| Example No. | Elongation (percent) | Ratio I/II | Cross-linking agent | Properties of uncross-linked blend | | | Properties of cross-linked blend | | |
|---|---|---|---|---|---|---|---|---|---|
| | | | | Stiffness (p.s.i.) | Yield (p.s.i.) | Elongation (percent) | Stiffness (p.s.i.) | Yield (p.s.i.) | Elongation (percent) |
| 5 | 4 | 1:1 | Magnesium acetate | 7,000 | 330 | 14 | 105,000 | 3,340 | 55 |
| 6 | 3.5 | 1:1 | Strontium hydroxide | 2,300 | 250 | 10 | 135,000 | 3,800 | 42 |
| 7 | 4.3 | 2:3 | Lithium hydroxide | 22,000 | 1,588 | 8 | 160,000 | 4,200 | 65 |
| 8 | 5.5 | 3:2 | Lead acetate | 9,000 | 360 | 18 | 80,000 | 3,000 | 120 |

[1] Tensile strength.

The sodium methylate-treated blend of Example I is extruded as a wire coating on No. 14 wire using a conventional extruder equipped with a pressure die. At 225° C. melt temperature, smooth, tough, abrasion resistant coatings are obtained.

The zinc acetate treated blend of Example I is well adapted to fabrication by injection molding. Chain links, gears, coil forms, and color chips are molded, using a conventional injection molding machine with the cylinder at 250° C. The molded parts are transparent, stiff and tough.

Tough, resilient 1 inch I.D. pipe is extruded from the sodium methylate-treated blend of Example I, using a cross-head die fitted to a conventional extruder. The melt temperature is 200° C.

The metal ion cross-linked copolymer blends of the present invention also exhibit surprising rheological properties. Thus, although having extremely low melt indices, which would indicate that the ionic copolymers are not melt fabricable, the opposite is true in that these blends can be melt extruded, injection molded, and compression molded with ease. This is explained, of course, by the difference in shear stress exerted on the melt in a melt indexer and in an extruder, for example. At low shear stresses, the high melt strength of the cross-linked blend results in low melt flow. However, once this is overcome by a higher shear stress, the metal ion cross-linked blends flow readily. The combination of high melt strength at low shear stresses and good melt flow at high shear stresses is highly desirable in all applications requiring forming of the melt subsequent to extrusion such as in bottle blowing in which an extruded parison is blown into a bottle and in thermoforming in which molten sheet is forced against a mold by means of a vacuum. In both these fabrication techniques, the blend melt becomes unsupported during some part of the fabrication cycle and it is, therefore, highly desirable that the blend melt have a high melt strength and good retention of shape. Similarly, the cross-linked blends of the present invention are extremely useful for the preparation of foams in that they overcome the extremely low strength of the foamed, but not yet solidified, polymer which has been a major problem in foam extrusion and which frequently has caused collapse of the foam.

An additional advantage that can be obtained in the blends of the present invention is coloration. By proper choice of metal ions and combination of metal ions, many colors can be produced in the metal ion cross-linked blends. This method of coloration has advantages over polymer dyeing in that dyes have a tendency to exude from hydrocarbon polymers and frequently are not compatible therewith. It also has an advantage over coloration by pigmentation in that the coloration is more uniform and even, particularly in light colors. Furthermore, colored compositions can be made transparent.

The cross-linked blends of this invention may be modified, if desired, by the addition of antioxidants, stabilizers, fillers and other additives employed in the art for either base polymer constituent in the blend. It is generally preferred to employ additives which do not interfere with the cross-links or cross-linking agent. Generally, however, additives do not interfere with the cross-linking compounds, used in this invention.

The high molecular weight cross-linked blends of the present invention can be extruded into films of excellent clarity, fibers of outstanding elasticity and resilience, pipes with superior stress-crack resistance, wire coatings with improved cut-through resistance and good dielectric properties despite the presence of metal ions, and foamed sheets; they further can be injection molded into intricate shapes and closely retain the dimension of the mold; they can be vacuum formed, blow molded and compression molded with greater ease and better properties than linear hydrocarbon polymers. Surfaces of these cross-linked blends are printable and adhere well to adhesives commercially available. Thus, they can be laminated to paper, metal foil and other plastic surfaces. The adhesion properties of the metal ion cross-linked blends are so good that they themselves can be employed as adhesives. Low moleculra weight ionic copolymers particularly are useful for such purposes. Many other uses and modifications of the ionic copolymers of the present invention will be apparent from the foregoing description and it is not intended to exclude such from the scope of this invention.

I claim:

1. A thermoplastic copolymer blend consisting essentially of from 5 to 95 weight percent, of a first addition copolymer consisting of at least 75 mole percent, based on said copolymer, of monomer units having the structure $R$—$CH=CH_2$, where —$R$ is a radical selected from the group consisting of hydrogen and alkyl radicals having from 1 to 8 carbon atoms, from 0.2 to 25 mole percent, based on the copolymer, of monomer units selected from the group consisting of alpha,beta-ethylenically unsaturated mono- and dicarboxylic acids containing from 3 to 10 carbon atoms, and the remainder, being composed of monomer units selected from the group consisting of monomer units having the structure $CH_2=CH-R_1$, wherein —$R_1$ is selected from the group consisting of aromatic radicals, ester radicals, amide radicals, acyloxy radicals, alkoxy radicals, halogens, acyl radicals, alkenyl radicals, and nitriles, and monomer units having the structure

wherein —$R_2$ is selected from the group consisting of halogens, and methyl, and —$R_3$ is selected from the group consisting of halogens, the phenyl radicals, ester radicals, amide radicals, alkenyl radicals, and nitriles; and blended therewith from 5 to 95 weight percent of a second addition copolymer, normally incompatible with said first addition copolymer, consisting of at least 50 mole percent, based on the copolymer, of monomer units selected from the group of monomer units having the structure, $CH_2=CH-R_1$, wherein $-R_1$ has the meaning defined above, and monomer units having the structure $$CH=C\begin{subarray}{l}R_2\\R_3\end{subarray}$$

wherein $-R_2$ and $-R_3$ have their respective meanings defined above, from 0.2 to 50 mole percent, based on the copolymer of monomer units selected from the group consisting of mono- and dicarboxylic acids containing from 3 to 10 carbon atoms, and the remainder being formed of monomer units having the structure $R-CH_2=CH_2$, where $-R$ has the meaning defined above; which copolymer blend contains, uniformly distributed throughout the copolymer blend metal ions having an effective valence of below 1.75, said metal ions being present in an amount of form 0.2 mole percent as based on the copolymers up to a stoichiometric equivalent based on the carboxylic acid groups present and wherein at least 10 percent of the carboxylic acid groups present are neutralized by the metal ions.

2. The blend of claim 1 wherein the degree of compatibility is such as to produce optical clarity.

3. The blend of claim 2 wherein the metal ions are monovalent.

4. The blend of claim 3 wherein the monovalent metal ions are alkali metal ions.

5. A process of forming compatible copolymer blends which comprises mixing at an elevated temperature an ionic metal in the final copolymer blend compound wherein the metal has an effective valence of less than 1.75, which compound is soluble in water to the extent of at least 2 weight percent, the ionized non-metallic radical of said compound, when combined with hydrogen, forming a reaction product removable from said reaction mixture by heating; with a copolymer blend consisting essentially of from 5 to 95 weight percent of an addition copolymer consisting essentially of at least 75 mole percent, based on the copolymer, of monomer units having the structure $R-CH=CH_2$, where $-R$ is a radical selected from the group consisting of hydrogen and alkyl radicals having from 1 to 8 carbon atoms, from 0.2 to 25 mole percent, based on the copolymer, of monomer units selected from the group consisting of alpha,beta-ethylenically unsaturated mono- and dicarboxylic acids containing from 3 to 10 carbon atoms, and the remainder being composed of monomer units selected from the group of monomer units having the structure $CH_2=CH-R_1$, wherein $-R_1$ is selected from the group consisting of aromatic radicals, ester radicals, amide radicals, acyloxy radicals, alkoxy radicals, halogens, acyl radicals, alkenyl radicals, and nitriles, and monomer units having the structure $$CH=C\begin{subarray}{l}R_2\\R_3\end{subarray}$$

wherein $-R_2$ is selected from the group consisting of halogens, and methyl, and $-R_3$ is selected from the group consisting of halogens, the phenyl radical, ester radicals, amide radicals, alkenyl radicals, and nitriles; and blended therewith from 5 to 95 weight percent of a second addition copolymer normally incompatible with said first copolymer consisting of at least 50 mole percent, based on the copolymer, of monomer units selected from the group of monomer units having the structure $CH_2=CH-R_1$, wherein $-R_1$ has the meaning defined above, and monomer units having the structure $$CH=C\begin{subarray}{l}R_2\\R_3\end{subarray}$$

wherein $R_2$ and $R_3$ have their respective meanings defined above, from 0.2 to 25 mole percent, based on the copolymer, of ethylenically unsaturated mono- and dicarboxylic acids containing from 3 to 10 carbon atoms, and the remainder being formed of monomer units having the structure $R-CH=CH_2$, where $-R$ has the meaning defined above; whereby said blend is transformed into an optically clear compatible cross-linked blend.

References Cited

UNITED STATES PATENTS

| | | | |
|---|---|---|---|
| 3,264,272 | 8/1966 | Rees | 260—78.5 |
| 3,236,914 | 2/1966 | Murdock et al. | 260—857 |

MURRAY TILLMAN, *Primary Examiner.*

C. T. SECCURO, *Assistant Examiner.*

U.S. Cl. X.R.

260—897

PO-1050
(5/69)

UNITED STATES PATENT OFFICE
CERTIFICATE OF CORRECTION

Patent No. 3,437,718                Dated April 8, 1969

Inventor(s) Richard Watkin Rees

It is certified that error appears in the above-identified patent and that said Letters Patent are hereby corrected as shown below:

Column 2, line 32, "fumarci" should be --- fumaric ---.
Column 6, line 52, "quaities" should be --- quantities ---.
In Column 10, Example No. 7 under column of Yield (p.s.i.) "1588" should be --- 1580 ---; line 38, "moleculra" should be --- molecular ---. Column 11, Claim 5, line 30, delete "in t final copolymer blend"; line 31, after "metal" insert --- in the final copolymer blend".

SIGNED AND
SEALED
MAY 26 1970

(SEAL)
Attest:

Edward M. Fletcher, Jr.
Attesting Officer

WILLIAM E. SCHUYLER, JR.
Commissioner of Patents